United States Patent [19]

Yamaguchi et al.

[11] Patent Number: 4,511,940
[45] Date of Patent: Apr. 16, 1985

[54] TAPE PLAYER HAVING MOTOR-DRIVEN TAPE-PACK LOADING MECHANISM

[75] Inventors: Katsumi Yamaguchi; Kazuki Takai; Hitoshi Okada, all of Saitama, Japan

[73] Assignee: Clarion Co., Ltd., Tokyo, Japan

[21] Appl. No.: 308,756

[22] Filed: Oct. 5, 1981

[51] Int. Cl.³ .................... G11B 23/10; G11B 5/54
[52] U.S. Cl. .................................. 360/96.6; 360/105
[58] Field of Search .................. 360/96.5, 96.6, 105

[56] References Cited

U.S. PATENT DOCUMENTS

| | | | |
|---|---|---|---|
| 3,902,193 | 8/1975 | Hapke | 360/90.6 |
| 4,208,681 | 6/1980 | Hatchett | 360/90.6 X |
| 4,344,098 | 8/1982 | Kamimura et al. | 360/90.6 |
| 4,377,829 | 3/1983 | Kamimura et al. | 360/90.6 X |

Primary Examiner—Aristotelis M. Psitos
Attorney, Agent, or Firm—Flynn, Thiel, Boutell & Tanis

[57] ABSTRACT

An automatic tape-pack loading mechanism adopted in a tape player, in which a rack portion is formed on a tape-pack holder which serves to receive a tape pack and drop it into the playing position, in which a motor-driven rotating piece is so provided as to be engaged with, and disengaged from, a rotary member engaged with said rack portion, and in which a lock link is disposed on a member supporting said rotary member to change the relation from engagement to disengagement or vice versa between said rotary member and rotating piece.

9 Claims, 7 Drawing Figures

TAPE PLAYER HAVING MOTOR-DRIVEN TAPE-PACK LOADING MECHANISM

BACKGROUND OF THE INVENTION

1. Field of the Invention

The present invention relates to an automatic tape-pack loading mechanism adopted in a tape player or magnetic tape recording/playing device, amd more particularly to a mechanism, of a simpler construction, for automatically and smoothly loading a tape pack into the playing position in the tape player.

2. Description of the Prior Art

Heretofore it has been proposed and adopted in some conventional tape players to utilize a motor drive for moving into the playing position a tape pack inserted in the player. The conventional tape-pack loading mechanisms use an intermittent-motion gear to unlock the tape-pack guide which is normally forced downward, thus dropping the tape pack into place for tape playing; in this mechanism, a large force is required to lift the tape pack for ejection after playing or in the course of playing for some reason. Namely, a large operating force is necessary for unloading the tape pack, which leads to disadvantages so that the operability of the tape player is low and no compact design of the mechanism is obtainable.

SUMMARY OF THE INVENTION

Accordingly, the present invention has as a primary object to overcome the above-mentioned drawbacks of the conventional automatic tape-pack loading mechanisms by providing a novel and improved automatic tape-pack loading mechanism.

The foregoing and other objects and advantages of the present invention will be better understood from the ensuing explanation, made by way of example, of the embodiments of the present invention illustrated in the accompanying drawings.

DETAILED DESCRIPTION OF THE PREFERRED EMBODIMENTS

Figure 1:
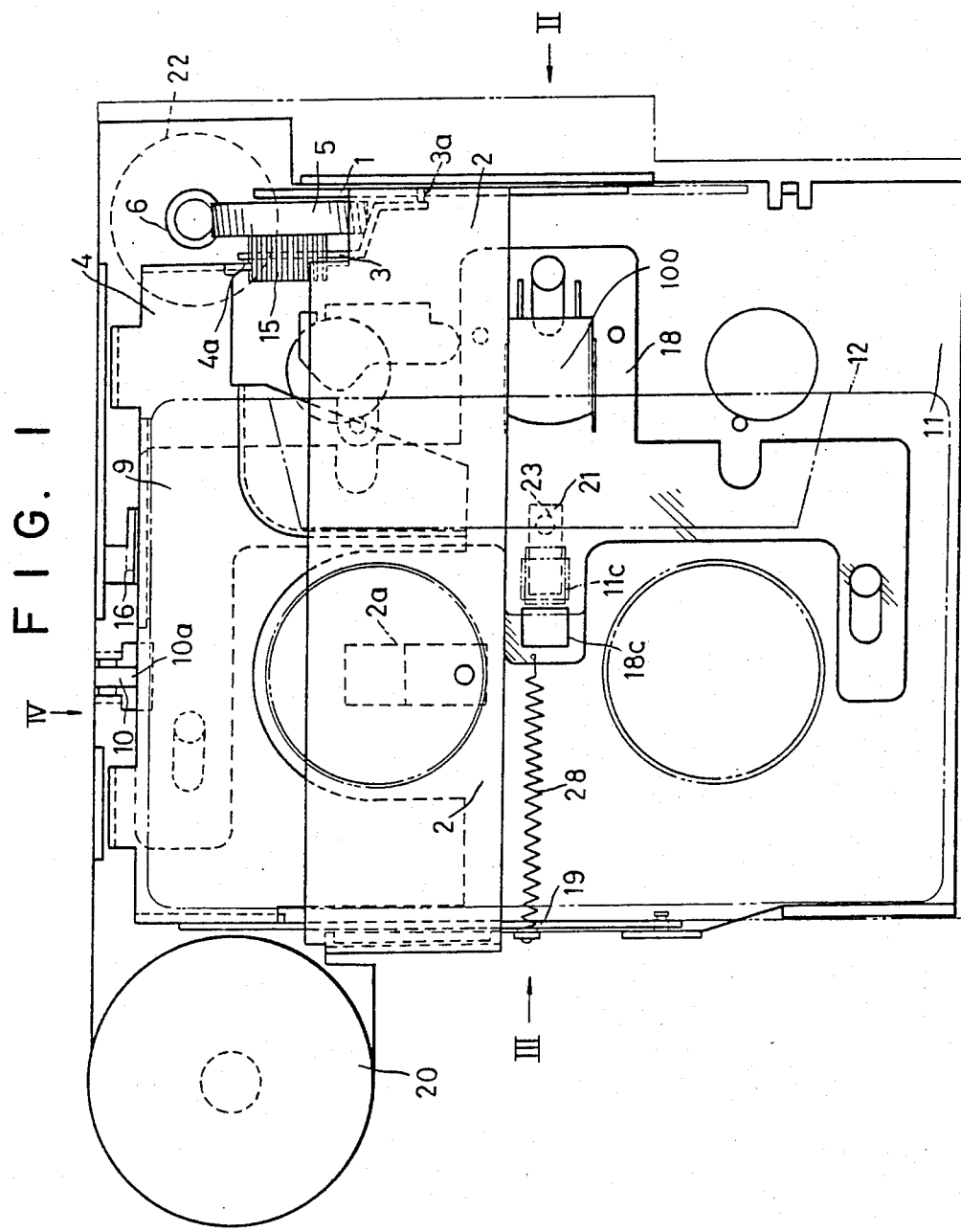
FIG. 1 is a plan view of a tape player equipped with a tape-pack loading mechanism according to the present invention.
Figure 2:
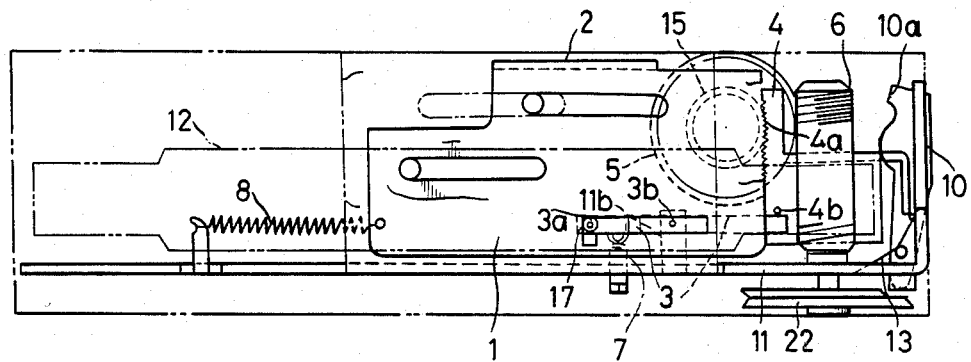
FIG. 2 is a side elevation of the player as viewed from the direction of arrow II in FIG. 1.
Figure 3:
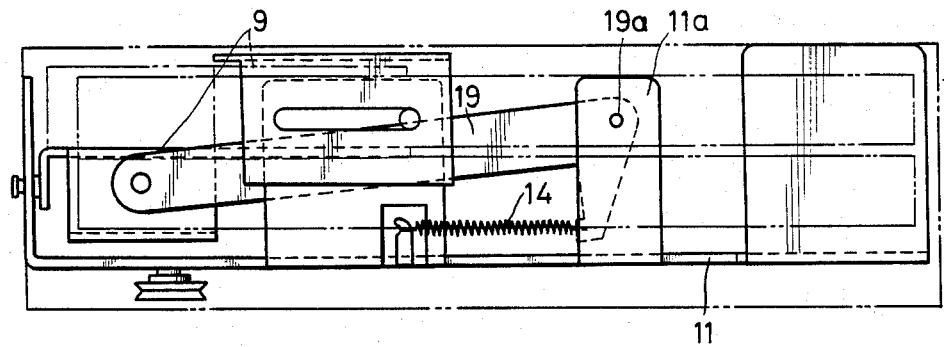
FIG. 3 is a side view of the player as viewed from the direction of arrow III in FIG. 1.
Figure 4:
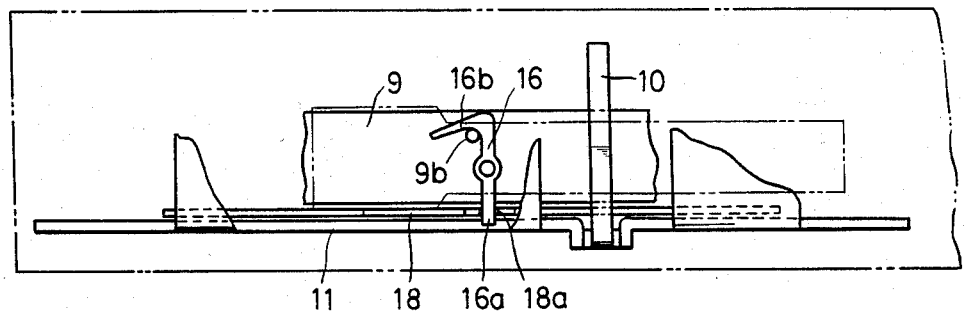
FIG. 4 is a side view of the player as viewed from the direction of arrow IV in FIG. 1.

Referring now to the drawings, there is movably supported on the top of a chassis 11 a push plate 2 formed integrally with a gear support 1. A spring 8 is provided between the push plate 2 and the chassis 1 to force the plate 2 to slide to the left in the plane of FIG. 2 (downward in the plane of FIG. 1). Further, said push plate 2 has provided inside thereof an elastic piece 2a, as shown in FIG. 1, which engages a tape pack 12 at a reel hole in the tape pack; thus, the push plate 2 is pushed to the right in the view of FIG. 2 (upward in the plane of FIG. 1). The gear support 1 such as described above has provided at the lower portion thereof an engagement hole 17 or slot of which one end is bent downward as shown in FIG. 2 to define a notch. Engaged in said engagement hole 17 is an engagement piece 3a provided at one end of a lock link or lever 3 which is pivotably supported at an intermediate point thereof on a supporting protrusion 11b of said chassis 11 by means of a pivot point 3b; the lock link 3 has fixed at one end thereof a sping 7 which normally forces said engagement piece 3a downward, the other end of this lock link 3 engaging a joint piece 4b provided on the lower end of a rack member 4. There is installed on the innermost side of the gear support 1 a worm wheel 5 which engages a worm 6 integrally assembled to a pulley 22 which is driven by a motor. As illustrated in FIG. 1, the worm wheel 5 has formed integrally therewith a spur gear 15 which can engage rack 4a of said rack member 4. Further, said rack member 4 has formed at the upper portion thereof a tape-pack holder 9 extending horizontally so as to be perpendicular to the sliding direction of said rack member 4. The tape-pack holder 9 has fixed to one end thereof a lever member 19 of which the base is pivotably mounted by means of a pivot piece 19a to support seat 11a of the chassis 11 as shown in FIG. 3. Further, there is fixed to the lower end of the lever member 19 a tension spring 14 which normally forces the lever member 19 and tape-pack holder 9 upward. There is installed on the innermost side of the tape-pack holder 9 a tape-pack ejecting piece 10 to which a spring 13 is fixed as shown in FIG. 2. Moving in of the ejecting piece 10 causes it to act on the tape pack 12 within the holder 9 so as to eject the tape pack 12. In addition, the chassis 11 has slidably provided thereon a head plate 18 with which a spring 28 is engaged, as seen in FIGS. 1 and 4. There is formed in the head plate 18 an engagement hole 18a in which a control portion 16a of a control lever 16 is inserted. A lock pin 9b provided on the tape-pack holder 9 is arranged as to engage an engagement portion 16b of the control lever 16 when the pin 9b is made to lower. Further, there is fixed to the bottom face of the chassis by means of a fixture 23 an elastic engagement plate 21 to disengage the head plate 18 from the tape pack 12, the free end of said elastic engagement plate 21 being so arranged as to face an engagement hole 18c in the head plate 18 through a through-hole 11c provided in the chassis 11.

The tape-pack loading mechanism according to the present invention, having been described in the foregoing, functions as in the following: The worm 6 is made to rotate through the pulley 22 by the motor 20. By inserting a tape pack 12 into the tape player, the elastic piece 2a of the push plate 2 engages a portion such as the reel hole in the tape pack 12 and slides together with the tape pack 12; thus, insertion of the tape pack 12 will cause the worm wheel 5 to engage the worm 6. The engagement piece 3a of the lock link 3 is made, under the action of the spring 7, to drop in the bent portion of the engagement hole 17 and assure the engaged relation between the worm wheel 5 and worm 6. The spur gear 15 is engaged with the rack 4a to lower the tape-pack holder 9 down to the playing position. When the tape pack 12 is made to lower its full extent, the engagement piece 4b of the rack plate 4 acts on the tail end of the lock link 3, thus releasing the locking of the gear support 1 by the lock link 3. Under the action of the spring 8, the gear support 1 is pulled to the left as viewed in the plane of FIG. 2, thus disengaging the worm 6 and worm wheel 5 from each other, while the the tape pack 12 forces down the elastic engagement plate 21 to disengage the head plate 18; the spring 28 acts to press the head 100 on the head plate 18 onto the tape within the tape pack 12. Namely, the tape playing condition is thus created, which condition is securely kept by the engagement pin 16b on the control lever 16 being engaged with the lock pin 9b provided on the tape-pack holder 9.

In case of ejecting the tape pack, the head plate 18 is moved back to the initial position so that the locking by the control lever 16 is eliminated. Then, the spring 14 acts to make the tape-pack holder 9 rise, and the ejecting piece 10, on which the spring 13 acts, ejects the tape pack 12.

Figure 5:
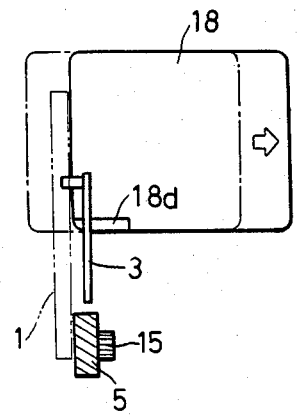
FIGS. 5 through 7 show a variation of the lock-link control mechanism included in the tape-pack loading mechanism of FIG. 1, FIG. 5 being a plan view of the mechanism, FIG. 6 being a longitudinal side view and FIG. 7 being a lateral side view.
Figure 6:
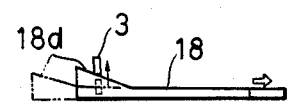
Figure 7:
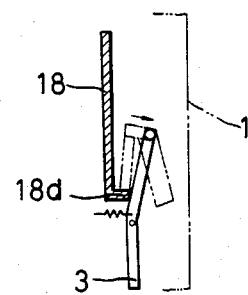

The present invention may be realized in variation in which the head plate 18, gear support 1 and lock link 3 are modified as shown in FIGS. 5 thru 7. Particularly, there is formed on the head plate 18 a cam 18d which functions to control the lock link 3. As the head plate 18 is made to move forward, it will raise the lock link 3 to eliminate the locking by the latter as shown in FIG. 7.

As having been described in the foregoing, according to the present invention, a tape pack can be loaded or set in the playing position only by inserting the tape pack into the tape player; consequently, a tape player is provided which can be easily operated with a reduced force, is excellent in operability, and of which the construction is simpler and the operation is more highly reliable.

The embodiments of the invention in which an exclusive property or privilege is claimed are defined as follows:

1. A magnetic tape recording/playing apparatus having a motor-driven tape-pack loading mechanism, comprising: a chassis; a push member supported on said chassis for reciprocal movement between first and second positions in directions substantially parallel to a first direction in which a tape-pack can be manually inserted into said apparatus, said push member having means engageable with a tape-pack manually inserted into said apparatus for limiting movement of the tape-pack in said first direction relative to said push member so that the tape-pack moves said push member from said first to said second position as the tape-pack is inserted; first resilient means yieldably urging said push member toward said first position in a second direction opposite said first direction; a tape-pack holder supported for movement in directions generally transverse of said first direction between a loading position and a playing position, said tape-pack holder being adapted to receive a tape-pack inserted into said apparatus in said first direction when said tape-pack holder is in said loading position; a magnetic tape head supported for movement between a playing position and a non-playing position in which said head is respectively engaging and spaced from a tape in a tape-pack disposed in said tape-pack holder when said tape-pack holder is in its playing position; second resilient means yieldably urging said head toward its playing position; locking means for releasably holding said head in its non-playing position; means for causing said locking means to release said head when said tape-pack holder has moved from its loading position into its playing position; a motor; first means driven by said motor and adapted to move said tape-pack holder from its loading to its playing position when said push member is in its second position, said first means including a rack provided on and extending approximately parallel to the direction of movement of said tape-pack holder, a gear which is rotatably supported on said push member and operatively engages said rack when said push member is in said second position, second means for drivingly coupling said motor to said gear when said push member is in said second position so that said motor effects rotation of said gear, and third means for interrupting said engagement between said gear and said rack when said tape-pack holder is in its playing position; and further locking means for releasably holding said push member in said second position, and wherein said third means causes said further locking means to release said push member when said tape-pack holder has reached said playing position.

2. The apparatus according to claim 1, wherein said second means includes a worm rotatably supported on said chassis and rotatably driven by said motor, and a worm gear rotatably supported on said push member coaxial with and fixed against rotation with respect to said first-mentioned gear, said worm gear and said worm being operatively engaged and free from operative engagement when said push member is in said second and first positions, respectively.

3. The apparatus according to claim 1, wherein said further locking means includes means defining an elongate slot in said push member which extends approximately in said first direction and has a notch at one end thereof, includes a locking lever which is pivotally supported on said chassis and has an engagement portion which is spaced from its pivot axis and is slidably received in said slot in said push member, and includes third resilient means which yieldably urges pivotal movement of said locking lever in a direction causing said engagement portion thereof to move into said notch when said engagement portion is at said one end of said slot.

4. The apparatus according to claim 3, wherein said third means includes said tape-pack holder being engageable with said locking lever as said tape-pack holder reaches its playing position in a manner causing said locking lever to pivot in a direction against the urging of said third resilient means so that said engagement portion thereon moves out of said notch at said one end of said slot in said push member, said first resilient means then returning said push member to its first position.

5. The apparatus according to claim 3, wherein said third means includes means defining a cam which moves with said head and is engageable with said locking lever, wherein as said head moves from its non-playing to its playing position, said cam causes said locking lever to pivot in a direction against the urging of said third resilient means so that said engagement portion thereof moves out of said notch of said slot in said push member, said first resilient means then returning said push member to its first position.

6. The apparatus according to claim 1, including third resilient means which yieldably urges said tape-pack holder toward its loading position, and further locking means for releasably holding said tape-pack holder in its playing position.

7. The apparatus according to claim 6, including fourth resilient means for yieldably urging a tape-pack disposed in said tape-pack holder in said second direction when said tape-pack holder is in its loading position.

8. The apparatus according to claim 1, including means which can operatively couple said motor to a tape-pack disposed in said tape-pack holder when said tape-pack holder is in its playing position for effecting movement of a tape provided in the tape-pack.

9. The apparatus according to claim 1, wherein said means on said push member for limiting movement of a tape-pack in said first direction relative to said push member includes an elastic piece provided on said push member and adapted to engage a tape-pack inserted into said apparatus.

* * * * *